United States Patent [19]

Locker

[11] Patent Number: 5,296,423

[45] Date of Patent: Mar. 22, 1994

[54] CORDIERITE SUBSTRATES

[75] Inventor: Howard J. Locker, Corning, N.Y.

[73] Assignee: Corning Incorporated, Corning, N.Y.

[21] Appl. No.: 816,240

[22] Filed: Jan. 3, 1992

[51] Int. Cl.$^5$ .................. C04B 35/02; C04B 35/04
[52] U.S. Cl. .................. 501/119; 501/118;
501/127; 501/141; 501/153; 501/154; 501/9;
264/60; 264/63; 264/176.1; 264/177.12
[58] Field of Search .............. 501/118, 119, 120, 141,
501/127, 150, 154, 153, 9, 39, 81, 128, 129;
264/60, 63, 176.1, 177.12

[56] References Cited

U.S. PATENT DOCUMENTS

| | | | |
|---|---|---|---|
| 3,885,977 | 5/1975 | Lachman et al. | 106/62 |
| 4,001,028 | 1/1977 | Frost et al. | 106/62 |
| 4,280,845 | 7/1981 | Matsuhisa et al. | 106/62 |
| 4,476,236 | 10/1984 | Inoguchi et al. | 501/118 |
| 4,869,944 | 9/1989 | Harada et al. | 428/116 |
| 4,950,628 | 8/1990 | Landon et al. | 501/119 |
| 4,973,566 | 11/1990 | Readey et al. | 501/129 |

*Primary Examiner*—Mark L. Bell
*Assistant Examiner*—Michael Marcheschi
*Attorney, Agent, or Firm*—Diane B. Elderkin; Kees van der Steere

[57] ABSTRACT

Cordierite-forming green substrates having high wet strength are prepared from fine-particle size minerals, including about 5 to 30 weight percent of delaminated kaolin and, preferably, about 15 to 39 weight percent calcined kaolin. The other fine-particle size minerals utilized are preferably talc having a particle diameter of about seven microns or less and alumina having a particle diameter of about one micron or less.

45 Claims, No Drawings

CORDIERITE SUBSTRATES

BACKGROUND OF THE INVENTION

This invention relates to a method for preparing high wet-strength green bodies of cordierite-forming admixtures, to a method for preparing cordierite substrates having high isostatic strength and to the admixtures of minerals and processing aids utilized to prepare such high wet-strength green bodies and cordierite substrates.

The exhaust gases emitted by internal combustion systems utilizing hydrocarbon fuels, such as hydrocarbon gases, gasoline or diesel fuel, can cause serious pollution of the atmosphere. Among the pollutants in these exhaust gases are hydrocarbons and oxygen-containing compounds, the latter including nitrogen oxides (NOx) and carbon monoxide (CO). The automotive industry has for many years attempted to reduce the quantities of gaseous emissions from automobile engine systems, the first automobiles equipped with catalytic converters having been introduced in model year 1975.

Catalytic converters often comprise cordierite substrates, onto which are coated noble metal catalysts. The cordierite substrates are typically in the form of a honeycomb body or multichannel monolith having substantially parallel cells or passages extending between open end faces thereof. The converter is placed in the path of the exhaust effluent of an automobile engine where the catalysts may act to convert hydrocarbons, CO and NOx to the non-toxic by-products water, carbon dioxide and reduced nitrogen species.

Those skilled in the art know that a sintered cordierite structure is typically made by mixing raw materials such as talc, kaolin clay, alumina, silica, aluminum hyroxide, various inorganic and organic binders and water to form a batch composition. See, for example, the disclosure of U.S. Pat. No. 3,885,977. This composition is then extruded into a honeycomb body. At this stage, before sintering, the honeycomb body is still wet and is frequently referred to as being "green". The term "green" is used in the art and in this application to refer to the state of a formed body or piece made of sinterable powder or particulate material that has not yet been fired to the sintered state. Only after firing at high temperatures does the structure obtain the strength and other characteristics of the final, desired ceramic product.

Manufacturers work continuously to optimize the characteristics of cordierite substrates to enhance their utility as catalyst carriers. At least in part because of a desire to lower exhaust backpressure in vehicles and thereby increase engine power, there has been a move to producing thinner-walled cordierite monoliths or honeycombs for use as catalyst carriers. It has also been desired to optimize the thermal shock resistance and strength of the cordierite substrates. It has been suggested, in U.S. Pat. No. 4,772,580, that these properties of cordierite structures can be enhanced by utilizing fine particles of both talc and kaolin in the preparation of the cordierite. U.S. Pat. No. 4,772,580 suggests that the talc particles should have an average particle diameter of not greater than 7 μm and the kaolin particles should have an average particle size of not greater than 2 μm and not greater than ⅓ of the average particle diameter of the talc particles and other raw materials for producing the cordierite.

Although the use of such fine raw materials leads to improved sintered products, it also results in additional processing difficulties. It is important that the green honeycomb body, prior to firing, have good strength, termed wet strength, as some handling of the body is inevitable subsequent to extrusion and prior to firing. For example, if a distortion is introduced at the skin region extruded green body while it is being transferred to the drying process, it may cause structural imperfections in the body which will reduce the strength (e.g., the isostatic strength) of the final, sintered ceramic product. Unfortunately, experience has shown that the wet strength of green bodies prepared from fine raw materials is not as great as that of such bodies when coarser materials are used. As a result, it is more likely that imperfections will be introduced in the body during handling and that the final sintered products will have unacceptably low isostatic strength.

It must also be noted that, to manufacture thinner wall substrates, the slots in dies through which the batch composition will be extruded must necessarily be thinner. Such thin slots have very high impedances, resulting in significantly elevated pressures and torques. One might add more water to the batch composition to lower pressures and torques, but this would also be expected to further reduce the wet strength of the extruded green body.

There is, accordingly, a clear need for a means for preparing sintered cordierite structures which exhibit the thermal shock resistance properties of products currently made from fine raw materials, but which are more easily processed, which exhibit good wet strength in the green state and which, as a result, exhibit good isostatic strength in the final sintered state.

SUMMARY OF THE INVENTION

It has now surprisingly been found that when specific clays are utilized in the preparation of cordierite structures from fine-particle size materials, the above-mentioned benefits can be obtained. More specifically, it has been found that by preparing a cordierite structure from an admixture of fine-particle size minerals, where about five to about thirty weight percent of the minerals is a delaminated kaolin, green bodies of enhanced wet strength can be obtained and, as a result, sintered ceramic structures with high isostatic strength are more predictably obtained. It has also been found that wet strengths can be enhanced still further by utilizing a calcined kaolin in the cordierite-forming admixture.

More specifically, this invention relates to a plasticizable admixture for use in preparing a substrate having cordierite as its primary phase, said admixture comprising the minerals (a) one or more sources of alumina having average particle diameters of about one micron or less;

(b) one or more sources of magnesia having average particle diameters of about seven microns or less; and (c) one or more kaolins having an average particle diameter, measured by x-ray sedigraph, not greater than about two microns, at least a portion of said kaolin being a delaminated kaolin, said delaminated kaolin comprising between about five and about thirty weight percent based on total minerals in the admixture, said admixture having a chemical composition comprising, by weight on an analytical oxide basis, about 11.5–16.5% MgO, about 33–41% $Al_2O_3$, and about 46.6–53.0% $SiO_2$. Preferably, this admixture also comprises calcined kaolin in an amount in the range of about 15 to about 39 weight based on total minerals in the admixture.

This invention also relates to an extrudable admixture which comprises the above-mentioned components, water, binder and lubricant. Still further, this invention relates to a method of producing a green body of cordierite-forming materials comprising preparing a plasticizable admixture as defined above, adding water and extrusion aids to said admixture and kneading said admixture to create an extrudable mixture, and extruding said admixture to form a substrate of the desired configuration. The green body so formed is dried and fired to yield a ceramic substrate having cordierite as its primary phase.

DETAILED DESCRIPTION OF THE INVENTION

A plasticizable admixture for use in preparing a substrate having cordierite as its primary phase is prepared according to this invention from specified kaolin materials and standard sources of alumina and magnesia which are known to be cordierite-forming materials. The relative amounts of these materials which will comprise the admixture will depend on the desired fired composition, but will generally be utilized so that, by weight on an analytical oxide basis, the admixture comprises about 11.5–16.5% MgO, about 33–41% $Al_2O_3$ and about 46.6–53.0% $SiO_2$.

Sources of alumina include alumina and aluminum hydroxide, and preferably a highly reactive alumina, having an average particle diameter of about one micron or less, is utilized. Sources of magnesia include talc, calcined talc, magnesium carbonate, magnesium hyroxide and magnesium oxide, and preferably a talc having an average particle diameter of about seven microns or less is utilized. Average particle diameters of the alumina and magnesia providing materials can be measured by standard x-ray sedigraph procedures.

The kaolin utilized in this invention is also of a fine particle size, generally having an average particle diameter of not greater than about two microns according to standard x-ray sedigraph procedure. Preferably, a high purity (low in potassium, sodium and calcium) is used.

Between about five and about thirty weight percent, preferably, between about ten and about sixteen weight percent, of the admixture, based on total minerals in said admixture, comprises delaminated kaolin. Kaolin occurs in "stacks" of platelets with one platelet stacked on top of others like slices in a loaf of bread. The term platelet denotes a particle which has two long dimensions and one short dimension. That is, the length and width of the platelet are much larger than its thickness. The length and width need not be equal but they must be much greater than its thickness. A stack of platelets forms a rod shaped grouping with the length of the stack being substantially larger than the diameter. These kaolin stacks can be broken apart, or delaminated, by mechanical processing whereby individual platelets are separated. Following delamination, each platelet generally has a diameter (or length and width) of possibly ten times or more its thickness.

Delaminated kaolins suitable for use in this invention are known and commercially available. Clays of a stacked habit may be used in preparing the admixtures of this invention, but if such clay stacks are used, the processing (mixing, pre-forming, forming) must be sufficient to break up the stacks into platelets before the plastic batch is finally formed for firing.

It is preferred that the admixture of this invention also comprise calcined kaolin, in the amount of about 15 to about 39 weight percent, more preferably 30 to 35 weight percent, based on total minerals in the batch. Inclusion of calcined kaolin has been found to further enhance the wet strength of extruded green structures, thereby allowing one to more predictably obtain sintered ceramic structures with high isostatic strength. The calcined kaolin, as with the remaining kaolin in the admixture, should have an average particle diameter of not greater than about two microns, said particle diameter being measured by x-ray sedigraph, and may optionally be delaminated.

Excellent results have been obtained by preparing a sintered cordierite honeycomb substrate from a mineral mixture comprising 14.80 weight % delaminated kaolin (average particle diameter approximately $1.5\mu$), 30.77 weight % calcined kaolin (average particle diameter approximately $1.2\mu$), 40.75% talc (average particle diameter approximately $6.5\mu$), and 13.68% reactive alumina (average particle diameter approximately $0.8\mu$).

Chemical components other than the main ones described above can adversely affect the thermal expansion of the cordierite honeycomb structures, so that impurities such as $TiO_2$, $CaO$, $K_2O$, $Na_2O$, $Fe_2O_3$, $R_2O_5$ or the like are preferably present in an amount no greater than 2.5%. Particularly, reduction of the amounts of alkali components such as $CaO$, $K_2O$ and $N_2O$ leads to improved thermal expansion properties of the honeycomb structures. The amount of $P_2O_5$ should be substantially zero or less than 0.1%.

The minerals of which the plasticizable admixture is comprised are combined in a mixing step sufficient to produce intimate mixing of the raw material phases to allow complete reaction in thermal processing. Water and extrusion aids, such as binders and lubricants, are added at this stage to help create an extrudable admixture which is formable or moldable. Sufficient extrusion aids well known in the art, such as binders (e.g., methylcelluloses) and lubricants (e.g., stearates), are added to give plastic formability and green strength prior to firing. Excellent results have been obtained utilizing a hydroxypropyl methylcellulose binder, preferably one, a two percent solution of which will yield a viscosity of 40,000 cps. Binder is preferably added to the admixture in an amount of about 2 to about 4, more preferably about 2.5 to about 3.2, weight percent based on inorganics in the admixture. The preferred lubricant is sodium stearate. Lubricant is preferably added to the admixture in an amount of about 0.4 to about 1.0, more preferably about 0.5 to about 0.8, weight percent based on inorganics in the admixture.

Water aids in plastic formability and may be controlled to benefit the specific composition. Generally, the batch raw materials utilized in this invention require between about 28 to about 35, preferably between about 30 to about 33, weight % water based on the dry batch (total organics and inorganics). Variations may be required to accommodate a change in raw materials or particle sizes.

The extrudable admixture prepared as described above can be formed into the desired structure by conventional ceramic forming processes. Generally, for preparing a honeycomb substrate of the type frequently used as catalyst carriers, an extrusion process is ideal. Other forming methods might include rolling and pressing of thin sheets to be used by themselves or to be assembled into honeycombed structures.

The green structure is generally dried, dielectrically, for a period of about 5–20 minutes prior to firing. The firing range for the cordierite body should be between about 1340° and about 1450° C., with a soak time sufficient to yield a substantially complete reaction to the cordierite phase. Soak times of about six to twelve hours are generally satisfactory.

As previously mentioned, it has been found that by utilizing a delaminated kaolin in combination with fine-particle-sized minerals in the cordierite-forming admixtures of this invention, and by also preferably including calcined kaolin as one of the components of the admixture, green bodies of enhanced wet strengths may be obtained. Wet strength, as used herein, corresponds to the ability of an extruded ribbon to resist stresses incurred in handling following extrusion. To measure wet strength, ribbon samples having $\frac{1}{8}''$ (0.05 cm) thickness times 1″ (0.39 cm) width and 2″ (0.79 cm) in length are extruded and cut. These samples are stored in plastic bags to guard against water loss. To measure the modulus of the samples, an Instron Tester with a plunger of $\frac{1}{8}''$ (0.20 cm) diameter attached to the crosshead is utilized. The ribbon sample is held at a controlled temperature which approximates the temperature of the extrusion process (generally in the range of about 23° to 50° C.). The sample is held in a fixture having a slot cut in it to the dimensions of the ribbon. A suitable such fixture is a two-piece aluminum plate, 1″ (0.39 cm) thick. The top piece of the plate has a slot approximately $\frac{1}{8}''$ (0.05 cm) thick, 2″ (0.79 cm) long and 1″ (0.39 cm) wide, and has a $\frac{1}{8}''$ (0.20 cm) diameter hole in the center through which the piston can pass. The bottom piece of the plate is a flat piece of aluminum which fits to the top piece, leaving a recess between the plates through which a temperature-controlled bath may be circulated. The plunger on the crosshead is placed adjacent to the surface of the ribbon, and the plunger impinges on the sample at a crosshead speed of 0.6 cm/min. The test is concluded when the load develops drops 5% below the maximum load measured. Wet strength is measured as the load per unit displacement, in kg/mm. It has been found that when extrudable admixtures of this invention are prepared containing water in an amount of 31.5–32 weight percent based on dry admixture, wet strengths of at least about 0.75 kg/mm, preferably of at least about 1.0 kg/mm, can be obtained. Because of enhanced wet strength, it is possible to more predictably obtain fired structures of high isostatic strength than when such structures are made from green bodies of lower wet strength. As explained previously, any imperfections introduced into the structure of the green body during handling prior to firing can dramatically reduce the isostatic strength of the fired product. If no such imperfections are introduced, the isostatic strength of the fired product can be desirably high in spite of lower wet strength exhibited by the green body. In the case, for example, of a sintered honeycomb substrate to be used as a catalyst carrier, the extrusion, drying and firing of the substrate necessarily entails a certain amount of handling of the green body, and since the walls of the body are thin and easily deformable, an increase in wet strength of that body can markedly improve the likelihood of consistently achieving fired ceramic products of high isostatic strengths.

The isostatic strength of sintered cordierite honeycomb substrates prepared as described herein can be measured as follows. Pressure is applied via an isostatic cell to the skin regions only of the substrate, the pressure being applied normal to the skin regions at a rate of about 120 psi ($8.4 \times 10^3$ g/cm$^2$) to a maximum of about 400 psi ($2.8 \times 10^4$ g/cm$^2$). The product is deemed to fail when the first audible cracking noise is discerned, this failure corresponding to the collapse of the first layer of cells adjacent to the skin of the substrate. For sintered cordieriete honeycomb structures prepared according to this invention, having a cell wall thickness/repeat distance ratio (repeat distance being the distance between cell walls in the honeycomb structure) in the range of about 0.100 to 0.111, isostatic strengths of about 300 pounds per square inch ($2.11 \times 10^4$ g/cm$^2$) or greater are predictably obtained.

One way to perform the isostatic strength test is to slip the sintered honeycomb substrate inside a rubber "boot" conforming to the shape of the sample and covering the skin region of the product. One open end of the "boot" is closed by placing, normal to the channels in the honeycomb substrate, a plexiglass plate having the same contour as the substrate (and thereby closing off the end of the boot). The other end of the "boot" is closed with an aluminum block, also contoured to the shape of the substrate, which has through it a tube open both to the interior of the boot and to the outside atmosphere. This aluminum block is surrounded by an O-ring and is clamped to the boot. The product so configured is placed in an isostatic cell pressure applied as described above. Because the tube in the one endpiece of the "boot" is open to the atmosphere, pressure is applied only to the skin region of the honeycomb, not to the center of the structure.

As indicated previously, a primary utility of the admixtures described herein is for preparing high strength cordierite honeycomb substrates useful as catalyst carriers. Although the invention is particularly advantageous for preparing thin-walled honeycombs, the claimed admixtures can also be used for preparing thicker walled structures. Methods of applying catalysts to the honeycomb structures, and utilizing those structures, for example, in automobile exhaust systems, are well known in the art. The admixtures may also be useful for preparing other high strength cordierite structures, as well, such as filters.

EXAMPLES

Admixtures of talc, kaolin and reactive alumina were prepared, mixed with water and extrusion aids, and extruded into ribbons which were tested, as described above, for wet strength. The talc had an average particle diameter of about 6.5μ, the reactive alumina had an average particle diameter of about 0.8μ, the delaminated kaolin (K-10) had an average particle diameter of about 1.5μ and the calcined kaolin (Glomax) had an average particle diameter of about 1.2μ. No delaminated kaolin is used in Comparative Example A. Instead, the kaolin comprises part calcined kaolin and part raw kaolin (Hydrite PX, average particle diameter about 1.2μ), neither of which were delaminated. The admixture utilized in Example 1 is identical to that of Example A except that the raw clay is replaced with delaminated clay. Example shows the results when the delaminated clay is reduced to increase the amount of calcined clay.

Each extrudable admixture contained approximately 32 weight % water, based on total organic and inorganic solids; approximately 2.9 weight %, based on total inorganics, of hydroxypropyl methylcellulose binder (a 2% solution of which has a viscosity of 40,000 cps); and approximately 0.75 weight %, based on total inorganics of sodium stearate lubricant. The remaining components, their amounts and wet strength data are presented in Table 1.

TABLE 1

| Example | Mineral Composition* | | Wet Strength |
|---|---|---|---|
| A | Talc | 40.47 wt. % | 0.33 kg/mm |
| | Alumina | 13.59 wt. % | |
| | Calc. Kaolin | 26.07 wt. % | |
| | Hydrite PX | 19.87 wt. % | |
| 1 | Talc | 40.47 wt. % | 0.86 kg/mm |
| | Alumina | 13.59 wt. % | |
| | Delam. Kaolin | 26.07 wt. % | |
| | Calc. Kaolin | 19.87 wt. % | |
| 2 | Talc | 40.86 wt. % | 1.44 kg/mm |
| | Alumina | 12.82 wt. % | |
| | Delam. Kaolin | 12.82 wt. % | |
| | Calc. Kaolin | 32.60 wt. % | |

*Percentages based on total minerals in admixture.

As these examples show, incorporation of delaminated kaolin in the admixture significantly increases the wet strength of extruded structures. The enhanced wet strength is obtained while maintaining the favorable fired properties of the corresponding admixture containing non-delaminated clay.

What is claimed is:

1. A plasticizable admixture for use in preparing a substrate having cordierite as its primary phase, said admixture comprising the minerals
   (a) at least one source of alumina having an average particle diameter of about one micron or less;
   (b) at least one source of magnesia having an average particle diameter of about seven microns or less;
   (c) at least one kaolin having an average particle diameter, measured by x-ray sedigraph, not greater than about two microns, at least a portion of said kaolin being a delaminated kaolin, said delaminated kaolin comprising between about five and about thirty weight percent based on total minerals in the admixture, and at least a portion of said kaolin being a calcined kaolin, said calcined kaolin comprising about 15 to about 39 weight percent based on total minerals in the admixture,
said mixture having a chemical composition comprising, by weight on an analytical oxide basis, about 11.5–16.5% MgO, about 33–41% $Al_2O_3$, and about 46.6–53.0% $SiO_2$.

2. The admixture of claim 1 wherein said delaminated kaolin comprises about ten to about sixteen weight percent based on total minerals in the admixture.

3. The admixture of claim 1 wherein said calcined kaolin comprises about 30 to about 35 weight percent based on total minerals in the admixture.

4. The admixture of claim 2 where said calcined kaolin comprises about 15 to about 39 weight percent based on total minerals in the admixture.

5. The admixture of claim 4 where said calcined kaolin comprises about 30 to about 35 weight percent based on total minerals in the admixture.

6. The admixture of claim 1 where said source of alumina comprises reactive alumina.

7. The admixture of claim 1 where said source of magnesia comprises talc.

8. The admixture of claim 1 which, when mixed with an organic binder, plasticizer and water, said water in an amount of about 31.5 to about 32 weight percent based on the dry admixture materials, mixed and extruded, exhibits a wet strength of at least about 0.75 kg/mm.

9. An extrudable mixture for use in preparing a substrate having cordierite as its primary phase, said admixture comprising the minerals:
   (a) at least one source of alumina having an average particle diameter of about one micron or less;
   (b) at least one source of magnesia having an average particle diameter of about seven microns or less;
   (c) at least one kaolin having an average particle diameter, measured by x-ray sedigraph, not greater than about two microns, at least a portion of said kaolin being a delaminated kaolin, said delaminated kaolin comprising between about five and about thirty weight percent based on total minerals in the admixture, and at least a portion of said kaolin being a calcined kaolin, said calcined kaolin comprising about 15 to about 39 weight percent based on total minerals in the admixture,
   and further comprising water in an amount between about 28 and 35 weight %, based on total organic and inorganic solids;
   said admixture having a chemical composition comprising, by weight on an analytical oxide basis, about 11.5–16.5% MgO, about 33–41% $Al_2O_3$, and about 46.6–53.0% $SiO_2$.

10. The admixture of claim 9 wherein said delaminated kaolin comprises about ten to about sixteen weight percent based on total minerals in the admixture.

11. The admixture of claim 9 wherein said calcined kaolin comprises about 30 to about 35 weight percent based on total minerals in the admixture.

12. The admixture of claim 8 wherein said calcined kaolin comprises about 30 to about 35 weight percent based on total mixtures in the batch.

13. The admixture of claim 9 wherein said source of alumina comprises reactive alumina.

14. The admixture of claim 9 wherein said source of magnesia comprises talc.

15. The admixture of claim 9 in which water comprises between about 30 to about 33 weight %, based on total organic and inorganic solids.

16. The admixture of claim 9 which further comprises at least one binder and at least one lubricating agent.

17. The admixture of claim 16 in which said binder is hydroxypropyl methylcellulose.

18. The admixture of claim 17 in which said binder is present in an amount of about 2 to about 4 weight % of said admixture, based on total inorganics.

19. The admixture of claim 18 in which said binder is present in an amount of about 2.5 to about 3.2 weight % of said admixture, based on total inorganics.

20. The admixture of claim 16 in which said lubricant is sodium stearate.

21. The admixture of claim 20 in which said lubricant is present in an amount of about 0.4 to about 1.0 weight % of said admixture, based on total inorganics.

22. The admixture of claim 21 in which said lubricant is present in an amount of about 0.5 to about 0.8 weight % of said admixture, based on total inorganics.

23. The admixture of claim 19 in which said source of alumina comprises reactive alumina; said source of magnesia comprises talc; water comprises between about 30 to about 33 weight % of said admixture, based on total organic and inorganic solids.

24. The admixture of claim 23 which further comprises between about 2.5 to about 3.2 weight %, based on total inorganics, of hydroxypropyl methylcellulose, and between about 0.5 to about 0.8 weight %, based on total inorganics, of sodium stearate.

25. The admixture of claim 9 which, when mixed with an organic binder, plasticizer and water, said water in an amount of about 31.5-32 weight percent based on the dry admixture materials, mixed and extruded exhibits a wet strength of at least about 0.75 kg/mm.

26. A method of producing a green substrate which, upon sintering, will yield a ceramic substrate having cordierite as its primary phase comprising:
(A) preparing a plasticizable admixture having a chemical comprising, by weight on an analytical oxide basis, about 11.5-16.5% MgO, about 33-41% $Al_2O_3$, and about 46.6-53.0% $SiO_2$, said plasticizable admixture comprising the minerals:
  (a) at least one source of alumina having an average particle diameter of about one micron or less;
  (b) at least one source of magnesia having an average particle diameter of about seven microns or less;
  (c) at least one kaolin having an average particle diameter, measured by x-ray sedigraph, not greater than about two microns, at least a portion of said kaolin being a delaminated kaolin, said delaminated kaolin comprising between about five and about thirty weight percent based on total minerals in the admixture, and at least a portion of said kaolin being a calcined kaolin, said calcined kaolin comprising about 15 to about 39 weight percent based on total minerals in the admixture;
(B) adding water and extrusion aids to said plasticizable admixture and kneading said admixture to create an extrudable admixture;
(C) extruding said plasticizable admixture to form said green substrate.

27. The method of claim 26 where said delaminated kaolin comprises about ten to about sixteen weight percent based on total minerals in the admixture.

28. The method of claim 26 where said calcined kaolin comprises about 30 to about 35 weight percent based on total minerals in the admixture.

29. The method of claim 26 where said calcined kaolin comprises about 30 to about 35 weight percent based on total minerals in the batch.

30. The method of claim 26 where said source of alumina comprises reactive alumina.

31. The method of claim 26 where said source of magnesia comprises talc.

32. The method of claim 26 in which water comprises between about 30 to about 33 weight %, based on total organic and inorganic solids.

33. The method of claim 26 which further comprises adding at least one binder and at least one lubricating agent.

34. The method of claim 33 in which said binder is hydroxypropyl methylcellulose.

35. The method of claim 34 in which said binder is present in an amount of about 2 to about 4 weight % of said admixture, based on total inorganics.

36. The method of claim 33 in which said binder is present in an amount of about 2.5 to about 3.2 weight % of said admixture, based on total inorganics.

37. The method of claim 33 in which said lubricant is sodium stearate.

38. The method of claim 37 in which said lubricant is present in an amount of about 0.4 to about 1.0 weight of said admixture, based on total inorganics.

39. The admixture of claim 38 in which said lubricant is present in an amount of about 0.5 to about 0.8 weight % of said admixture, based on total inorganics.

40. The method of claim 38 in which said source of alum comprises reactive alumina; said source of magnesia comprises talc; water comprises between about 30 to about 33 weight % of said admixture, based on total organic and inorganic solids.

41. The method of claim 26 further comprises between about 2.5 to about 3.2 weight %, based on total inorganics, of hydroxypropyl methylcellulose, and between about 0.5 to about 0.8 weight %, based on total inorganics, of sodium stearate.

42. The product of the method of claim 40 which, when mixed with an organic binder, plasticizer and water, said water in an amount of about 31.5-32 weight percent based on the dry admixture materials, mixed and extruded exhibits a wet strength of at least about 0.75 kg/mm.

43. The method of claim 26 in which said green substrate is dried and fired to yield a ceramic substrate having cordierite as its primary phase.

44. The method of claim 26 in which said green substrate is a honeycomb monolith.

45. A method of producing a green substrate which, upon sintering, will yield a ceramic substrate having cordierite as its primary phase comprising:
(A) preparing a plasticizable admixture having a chemical comprising, by weight on an analytical oxide basis, about 11.5-16.5% MgO, about 33-41% $Al_2O_3$, and about 46.6-53.0% $SiO_2$, said plasticizable admixture comprising the minerals:
  (a) at least one source of alumina having an average particle diameter of about one micron or less;
  (b) at least one source of magnesia having an average particle diameter of about seven microns or less;
  (c) at least one kaolin having an average particle diameter, measured by x-ray sedigraph, not greater than about two microns, at least a portion of said kaolin being a delaminated kaolin, said delaminated kaolin comprising between about five and about thirty weight percent based on total minerals in the admixture, and at least a portion of said kaolin being a calcined kaolin, said calcined kaolin comprising about 15 to about 39 weight percent based on total minerals in the admixture;
(B) extruding said plasticizable admixture to form said green substrate.

* * * * *

UNITED STATES PATENT AND TRADEMARK OFFICE
CERTIFICATE OF CORRECTION

PATENT NO. : 5,296,423
DATED : March 22, 1994
INVENTOR(S) : Robert J. Locker

It is certified that error appears in the above-indentified patent and that said Letters Patent is hereby corrected as shown below:

On the Title Page, item 75
Inventor's name "Howard" should be "Robert"

Col. 3, line 6, insert "%" after "weight"

Col. 6, line 68, insert "2" after "Example"

Col. 8, line 39, "8" should be "10"

Col. 10, line 12, insert "%" after "weight"

Col. 10, line 18, "alum" should be "alumina"

Signed and Sealed this

Thirteenth Day of September, 1994

Attest:

BRUCE LEHMAN

*Attesting Officer*  *Commissioner of Patents and Trademarks*